United States Patent

[11] 3,568,089

| [72] | Inventor | Keiichi Tanaka |
| | | Tokyo, Japan |
| [21] | Appl. No. | 743,154 |
| [22] | Filed | July 8, 1968 |
| [45] | Patented | Mar. 2, 1971 |
| [73] | Assignee | Agency of Industrial Science & Technology |
| | | Chiyoda-ku,Tokoyo, Japan |
| [32] | Priority | July 11, 1967 |
| [33] | | Japan |
| [31] | | 42/44155 |

[54] INTERNAL MIRROR GAS LASER DISTANCING APPARATUS, LOW VOLTAGE STABLE DISCHARGE DEVICE, AND FREQUENCY MODULATION MEANS
4 Claims, 1 Drawing Fig.

[52] U.S. Cl. .................................................. 331/94.5, 356/106
[51] Int. Cl. ..................................................... G01b 9/02
[50] Field of Search ........................................ 331/94.5; 356/106, 112

[56] References Cited
UNITED STATES PATENTS

| 3,166,673 | 1/1965 | Vickery et al. ............... | 332/7.51 |
| 3,170,122 | 2/1965 | Bennett, Jr. .................. | 331/94.5 |

*Primary Examiner*—William L. Sikes
*Attorney*—Ernest G. Montague

ABSTRACT: An apparatus for use in a gas laser having internal mirrors comprising an electric discharge tube, a cathode chamber operatively connected with one end of the electric discharge tube, an anode chamber operatively connected to the other end of the discharge tube, and two reflecting mirrors one mounted on the wall of the cathode chamber and the other on the wall of the anode chamber and aligned opposite one another in the direction of the axis of the electric discharge tube. An anode means forms the wall of the anode chamber and surrounds the other end of the electric discharge tube and varies the length of the anode chamber in the axial direction. Means are provided for varying the length of the anode means.

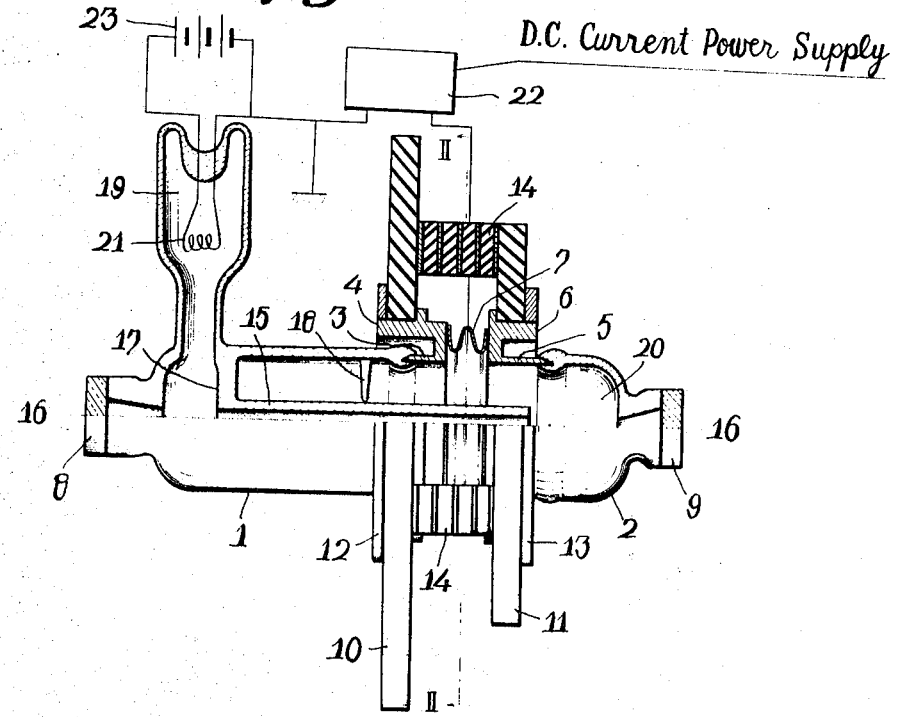
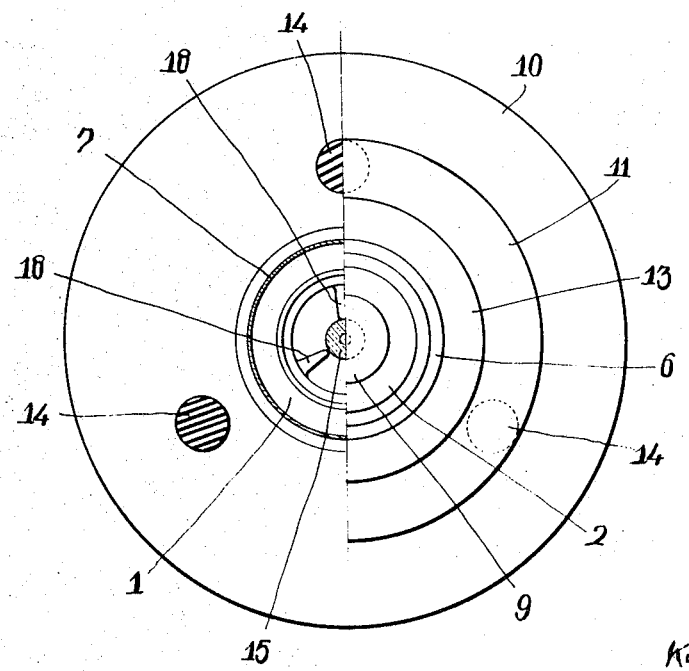

INTERNAL MIRROR GAS LASER DISTANCING APPARATUS, LOW VOLTAGE STABLE DISCHARGE DEVICE, AND FREQUENCY MODULATION MEANS

The present invention relates to an apparatus for use in a gas laser having internal mirrors.

Recently, gas lasers containing low-pressure mixed gases were developed. These gas lasers are used in various applications in the fields of physics and engineering.

In order to utilize effectively the very narrow width spectral lines which are a feature of laser rays, it is necessary to stabilize the wavelength of the laser rays. For this object, such a construction must be employed which will maintain precisely the two reflecting mirrors which form the laser resonator at an accurate distance from each other and which will prevent outside influences, such as mechanical vibrations, sound waves and the like from changing the distance between the mirrors. Further, it is desirable in such a construction to be able to adjust the distance between the reflecting mirrors, should the distance be varied, for example, by temperature changes of the mixed gases in the laser tube.

Heretofore, with gas lasers having external mirrors, the distance between the mirrors could be easily adjusted. With gas lasers having internal mirrors it is known to adjust the distance between the reflecting mirrors by connecting parts of the laser tube with a metal bellows. However, such known means for adjusting the distance between the mirrors is very complicated.

It is one object of the present invention to provide an apparatus for use in a gas laser having internal mirrors in which the distance between the reflecting mirrors may be easily adjusted.

It is another object of the present invention to provide an apparatus for use in a gas laser which is capable of maintaining stable electric discharges at a lower voltage than conventional gas lasers.

It is still another object of the present invention to provide an apparatus for use in a gas laser which is capable of easily performing frequency modulation.

With these and other objects in view, which will become apparent in the following detailed description, the present invention will be clearly understood in connection with the accompanying drawing, in which:

FIG. 1 is a front elevation, partly in section, of the gas laser according to the present invention; and FIG. 2 is a right-hand elevation, partly in section along the line II–II of FIG. 1.

Referring now to the drawing, the openings of two cylindrical quartz glass pieces 1 and 2 having reflecting mirrors 8 and 9 on their remote ends, respectively, are positioned opposing each other. The openings are connected in airtight relationship with the ends of internal cylinders 3 and 5 of double metal cylinders 4 and 6, respectively. The other ends of the cylinders 4 and 6 are joined in airtight relationship to a metal bellows 7, so that the laser tube is capable of varying its length in the axial direction.

Mounted on the outer cylinders of the double metal cylinders 4 and 6 are insulators 10 and 11, respectively, which are made preferably of glass, hard ceramics, or the like. The insulators 10 and 11 are fixed to the cylinders 4 and 6 by washers 12 and 13, respectively. Mounted between the insulators 10 and 11 are preferably three cylindrical laminated piezoelectric elements 14, with their opposite ends fixed to the insulators 10 and 11 so that a predetermined distance can be maintained therebetween, and further so that the distance can be finely adjusted by a voltage from a control power supply (not shown) which is connected to the laminated piezoelectric elements 14.

Inside the laser tube, an electric discharge tube 15 is installed and axially positioned so as to permit the optical axes 16 of the reflecting mirrors 8 and 9 to pass therethrough. The discharge tube 15 is supported by a partition wall 17 and supports 18. The partition wall 17 divides the laser tube into a cathode chamber 19 which has a hot cathode 21 therein, and an anode chamber 20, the latter having an anode consisting of the double metal cylinders 4 and 5 and the metal bellows 7.

Low-pressure mixed gas is contained in the laser tube. The metal bellows 7 and the metal cylinders 4 and 6, as the anode, are connected to a direct current power supply 22. The electric discharge tube 15 is disposed between the anode and the hot cathode 21 so as to cause an electric discharging. As a result, stabilized laser oscillations can be maintained.

Due to the above construction of the laser tube according to the present invention, the end of the electric discharge tube 15, constituting the anode chamber 20, is surrounded by the cylindrical anode; and therefore, electric discharge can be performed at lower voltages than required for conventional lasers. Additionally, since the electron flow runs from the cathode side to the anode side through the discharge tube 15 and disperses toward the surrounding anode at the outlet of the discharge tube, it is possible to prevent damage to the reflecting mirror caused by electron collision.

Since the three laminated piezoelectric elements 14 are connected in parallel with DC voltage of AC voltage control power supply, the distance between the reflecting mirrors can be finely adjusted by control of the voltage of the supply. Accordingly, the selection of oscillating frequencies or frequency modulation can be performed easily.

In this embodiment, three laminated piezoelectric elements are illustrated; however, similar functions can be performed if one cylindrical piezoelectric element having an inner diameter larger than that of the metal cylinders 4 and 6 is used in place of three laminated piezoelectric elements.

I claim:

1. An apparatus for use in a gas laser having internal mirrors, comprising:
    an electric discharge tube;
    a cathode chamber operatively connected with one end of said electric discharge tube;
    an anode chamber operatively connected with the other end of said discharge tube;
    two reflecting mirrors, one of which is mounted on the wall of said cathode chamber and the other of which is mounted on the wall of said anode chamber, and oriented opposite one another in the direction of the axis of the electric discharge tube;
    an anode means forming the wall of said anode chamber surrounding said other end of the electric discharge tube and for varying the length of said anode chamber in said axial direction; and
    means for varying the length of said anode means.

2. The apparatus, as set forth in claim 1, wherein;
    said anode means comprises;
    two metal cylinders; and
    a metal bellows joined in airtight relationship between said two metal cylinders at adjacent ends thereof.

3. The apparatus, as set forth in claim 2, wherein:
    said means for varying the length of said anode means comprises;
    an annular insulator secured to each of said two metal cylinders at the outer cylindrical surface of the latter; and
    voltage adjustable laminated piezoelectric elements mounted between said annular insulators.

4. The apparatus, as set forth in claim 3, further comprising:
    two cylindrical laser housing pieces having end openings axially aligned adjacent one another;
    said electric discharge tube axially disposed within said laser housing pieces;
    said reflecting mirrors disposed at the remote ends of said housing pieces;
    said metal cylinders each comprise double cylinders having an inner cylinder and an outer cylinder and one annular walled common end;
    said metal bellows secured to and between said annular walled common ends of said two metal cylinders, in airtight relationship;

said annular insulators secured to said outer cylinders; and the other ends of each of said inner cylinders are sealed in airtight relationship to one of said cylindrical laser hous-ing pieces at said end openings, respectively, thereby forming an airtight axial-length variable laser with internal mirrors.